Aug. 26, 1941.    E. MATHA    2,253,636
APPARATUS AND METHOD OF CUTTING ARTICLES FROM SHEETS AND THE LIKE
Original Filed Jan. 6, 1939    4 Sheets-Sheet 2

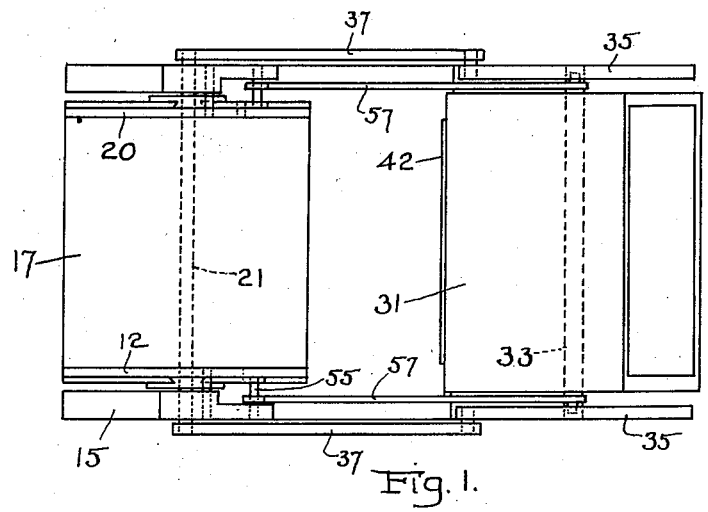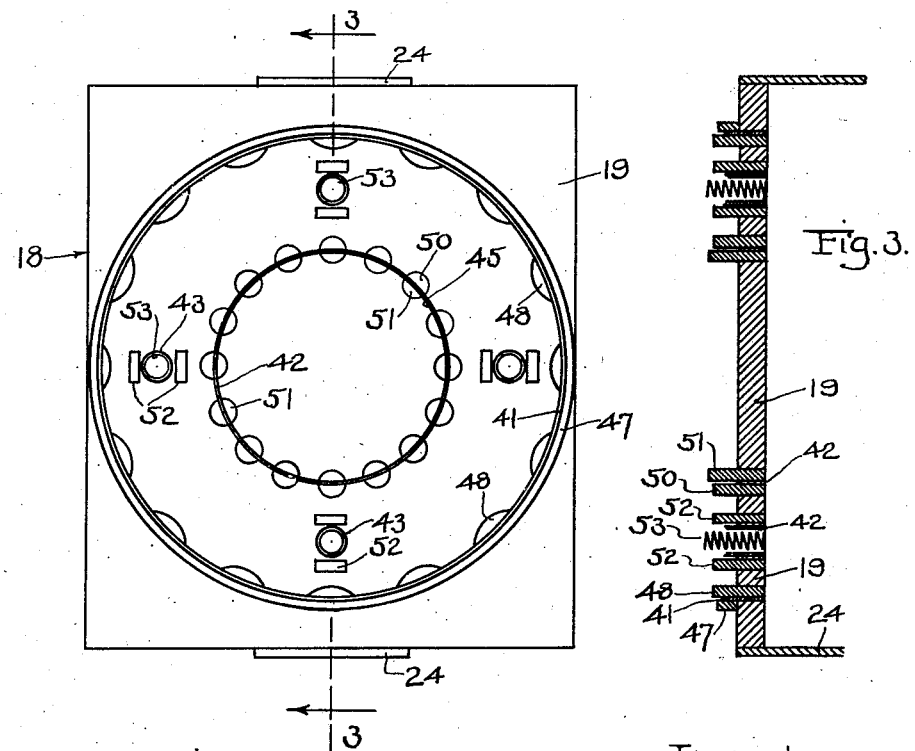

Inventor:
Emil Matha,
by E. Andrews
Atty.

Aug. 26, 1941.  E. MATHA  2,253,636
APPARATUS AND METHOD OF CUTTING ARTICLES FROM SHEETS AND THE LIKE
Original Filed Jan. 6, 1939  4 Sheets-Sheet 3

Inventor:
Emil Matha,
by E J Andrews
Atty.

Inventor:
Emil Matha,
by E. J. Andrews
Atty.

Patented Aug. 26, 1941

2,253,636

UNITED STATES PATENT OFFICE 2,253,636

APPARATUS AND METHOD OF CUTTING ARTICLES FROM SHEETS AND THE LIKE

Emil Matha, Chicago, Ill.

Substituted for abandoned application Serial No. 247,173, January 6, 1939. This application February 12, 1940, Serial No. 318,639

19 Claims. (Cl. 164—19)

My invention relates primarily to a method and apparatus for cutting articles from sheet material, such as cutting gaskets from sheet paper, leather, or other material. A particular object of the invention is to suitably cut, strip and stack the articles so that the waste pieces will be stacked separately from the product to be used, the entire process being continuous and automatic. Other objects of the invention will be apparent from a consideration of the drawings herein and the following description thereof.

One feature of the present invention relates to the provision of an apparatus and a method of operation, such that objects may be die cut from a sheet of stock, the arrangement being such that various portions of the die cut material may be ejected at different times during the cycle of operations, and, if desired, at different locations. In this connection it is an object to provide an arrangement including a plurality of ejectors in combination with the cutting rules, together with means to ensure operation of said ejectors successively after the cutting rules have performed their cutting operation, so that the several portions of the stock which have been die cut may be successively ejected.

Still more specifically, it is an object of the invention to provide, in combination with a suitable platen, a die bed and a cutting die, all said parts being relatively movable with respect to each other, together with means to ensure relative movement of said parts in such manner that the relative positions of the die bed and the cutting die may be modified after the cutting engagement with the platen has ceased. Also, to provide in conjunction with said parts suitable ejectors, generally carried by the cutting die element, and which ejectors co-operate with the die bed in such manner that the relative movements of the die bed and the cutting die serve to actuate these ejectors effectively to cause them to perform their ejecting functions in proper timing after these parts have been moved away from the platen, or vice versa. Still more specifically, it is an object in connection with the above, to so arrange the parts that, if desired, these ejectors may be caused to perform their ejecting functions successively, to thereby ensure ejection of the cut out portions at different times during the cycle of operations; and also, if desired, to ensure delivery of said different cut out portions at different locations.

In the drawings:

Figure 1 is a plan view of a machine press which may be used in carrying out my invention; the machine therein shown being of more or less schematic form to show more particularly the principal operating parts thereof;

Figure 2 shows a face view, materially enlarged, of the cutting die plate and knives and ejectors; the schematic form shown in this figure being intended for cutting out simple gaskets of the form shown in Figure 4;

Figure 3 shows a sectional view along the line 3—3 of Figure 2, looking in the direction of the arrows; and Figure 3 shows the element which I have heretofore referred to as the cutting die;

Figure 5:
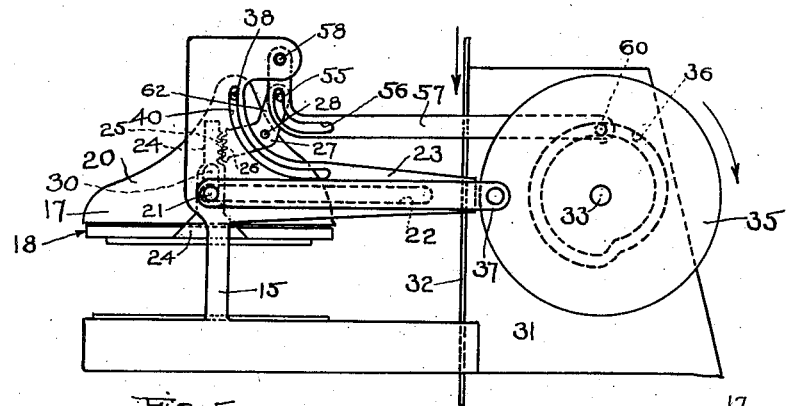
Figure 5 shows the press operating mechanism when the cutting die is in its initial or retracted position; and corresponds to the position of the parts shown in Figure 1.
Figure 6:
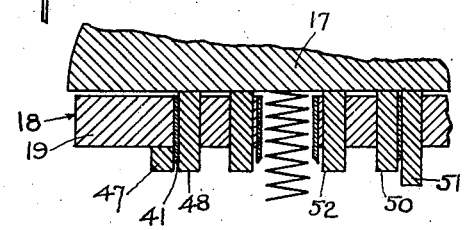
Figure 6 is an enlarged, fractional, sectional view of the cutting die when it is in its retracted position; being the position of the die bed and cutting die at the commencement of a cycle of operations.
Figure 7:
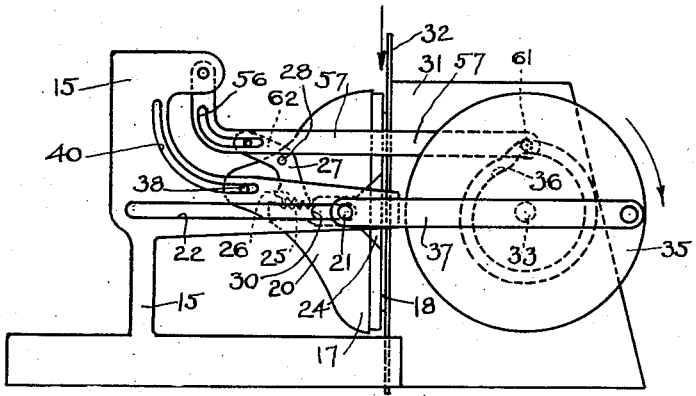
Figures 7 and 8 are corresponding views showing the mechanism as the cutters have penetrated the sheet material and press against the platen; being views corresponding to Figures 5 and 6, but showing the die bed and cutting die in their co-operative locations with respect to the platen at that portion of the cycle of operations when the rules have cut through the sheet of stock.
Figure 8:
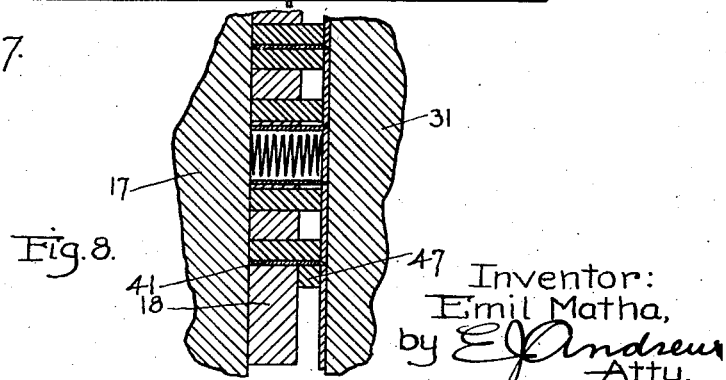
Figure 9:
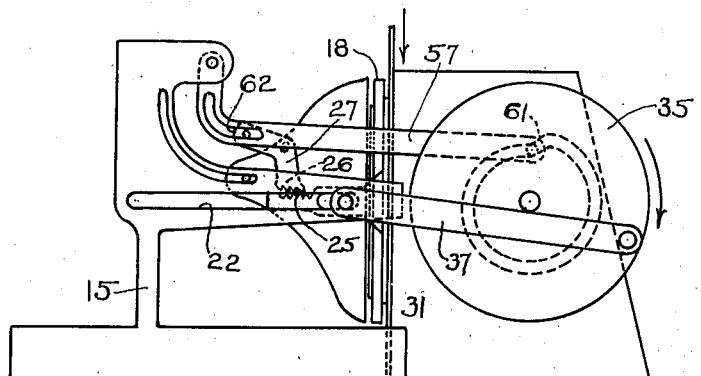
Figure 10:
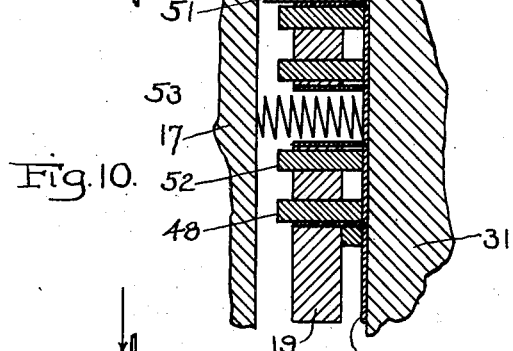
Figure 11:
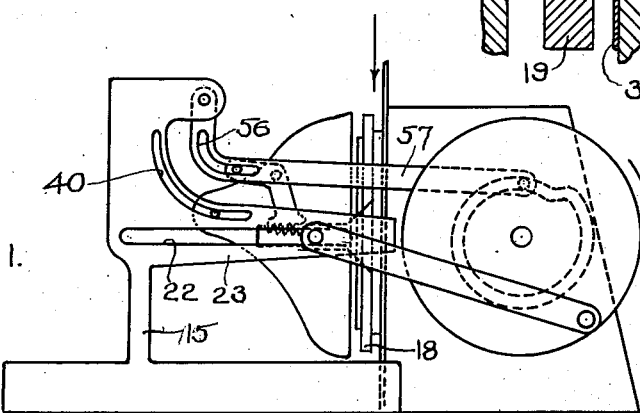
Figure 12:
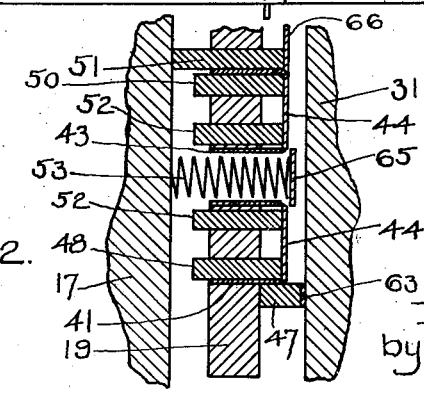
Figure 13:
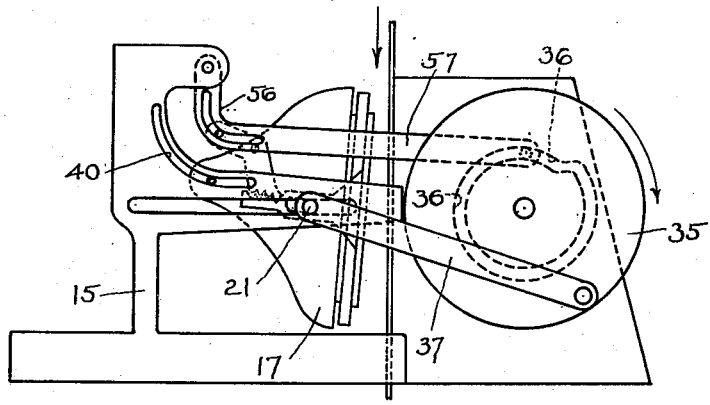
Figure 14:
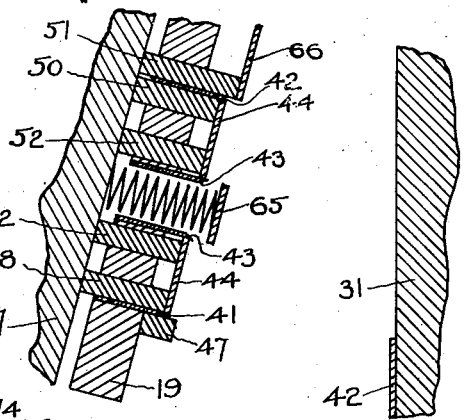
Figure 15:
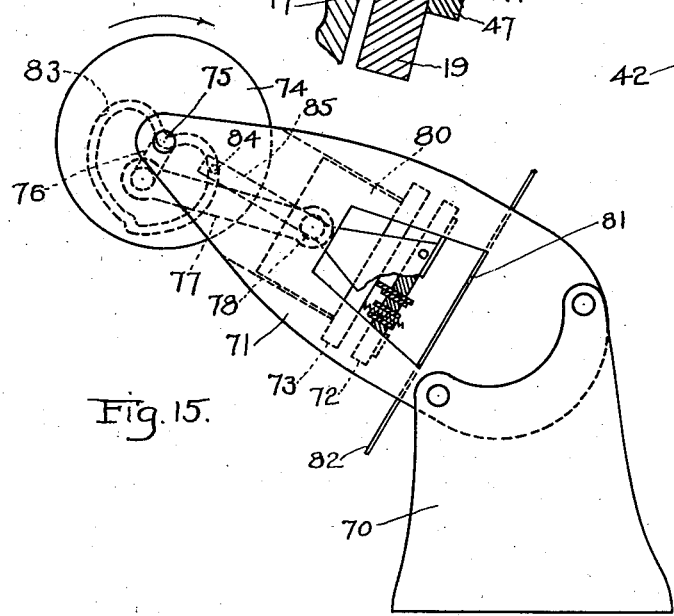

Figures 9 and 10 are corresponding views showing the mechanism as the die bed is being withdrawn from the cutting die; being views corresponding to Figures 5 and 6, but with the parts in their locations directly after the stage shown in Figures 7 and 8, and when the die bed has been withdrawn somewhat from the position of Figures 7 and 8, and away from the platen and the cutting die, leaving the cutting die in the position which it occupied at the preceding stage of Figures 7 and 8;

Figures 11 and 12 are corresponding views as the cutting die is being withdrawn from contact with the platen and is ejecting some material; being views corresponding to Figures 5 and 6, but with the parts in their locations directly after the stage shown in Figures 9 and 10, and when some of the ejectors have acted to eject material directly adjacent to them;

Figures 13 and 14 show the mechanism as the cutting die is being brought towards the die bed and is ejecting other material; being views corresponding to Figures 5 and 6, but showing the parts in the positions which they occupy in the stage next succeeding the stage of Figures 11 and 12, and when the cutting die has been restored partially towards the die bed, both the die bed and the cutting die having moved back somewhat towards their initial locations; and Figure 15 is an elevation of another type of press which may be used in carrying out my invention; being a schematic elevation of a press wherein the die bed may be moved directly back and forth with respect to the platen, and without the need of performing a right angular turn during such movement, as in the case of the arrangement of Figures 1 to 3, and 5 to 14, inclusive.

The mechanism which I prefer in carrying out my method includes the frame 15 which supports the die bed 17 and the cutting die 18 and the operating mechanism. Referring to Figures 5 and 6, which show the mechanism in its initial position, the die 18 is there held against the bed 17. The bed is supported by the shaft 21 which passes through the bed. The ends of the shaft 21 play in slots 22 formed in the forwardly projecting arms 23 of the frame. By these means the bed 17 may be swung and slid forward and backward in the frame, as hereinafter set forth.

The cutting die 18 is also rotatably and slidably mounted in the frame by means of arm 24 to which the edges of the die 18 are fixed. Formed in the upper ends of these arms 24 are gear racks 25 which mesh with gear racks 26 in levers 27, it being understood that all of these elements of the operating mechanism are duplicated on opposite sides of the frame. Fixed to the opposite edges of the bed 17 are plates or arms 20 to which the respective levers 27 are pivoted by means of pins 28. By suitably operating the levers 27 the cutting die 18 is moved with reference to the bed 17, a slot 30 in each arm 24, through which the shaft 21 passes, allowing relative movement of the bed and die. In carrying out my method the bed and die are shifted by swinging from the horizontal positions of Figure 5 to the vertical positions of Figure 7, and at the same time they are moved towards the platen 31 which supports the sheet material 32 which is to be cut.

The mechanism for operating the bed and die in this manner consists of a pair of disk wheels 35 mounted for rotating on opposite sides of the frame by means of a shaft 33. Each wheel has therein a cam groove 36, and pivoted near its periphery is the inner end of a link 37. The outer ends of the shaft 21 pass through the respective outer ends of the links 37, so that, as the wheels 35 rotate, the shaft, with the die bed and die will be drawn towards the platen 31. As the bed and die are drawn towards the platen by the rotation of the wheels from the position of Figure 5, pins or rollers 38, fixed to the upper portions of the arms 20, and playing in slots 40, will force the bed and die to swing on the shaft 21 and pass from the horizontal positions to the vertical positions of Figure 7. When the vertical positions are reached the cutting die 18 will be forced by the wheels toward the platen until the cutters of the die are forced through the sheet 32 from which the gaskets or other objects are to be cut. The wheels 35 may be rotated in any suitable manner.

Figure 4:
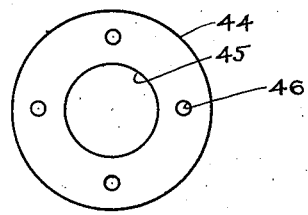
Figure 4 is a plan view of a gasket such as may be produced by the press herein disclosed and illustrated.

The cutter plate and cutters may be of any suitable type. I have indicated in Figure 2 a plate 19, which may be of wood or any other suitable material. In this plate are set the cutters 41, 42 and 43, which may be steel cutting rules. The article to be formed in this case consists of a gasket 44, Figure 4, having a large central opening 45 and several small openings 46. In order to force the cut pieces from the cutters suitable ejectors are provided. In this case I show a continuous ejector 47 which encircles the cutter 41 and which may be composed of rubber, cork, springs or any suitable material. This ejector is preferably firmly attached to the cutter plate 19 adjacent to the cutter 41, and it projects outwardly from the plate a sufficient distance beyond the edge of the cutter which it encircles.

In addition I provide a plurality of ejectors which are slidably mounted in the cutter plate 19 adjacent to the other cutters and the cutter 41. In this instance I show the ejectors 48 which are positioned inside the cutter 41; the ejectors 50 and 51 on opposite sides of the cutter 42; the ejectors 52 on opposite sides of the cutters 43; and the ejectors 53 positioned within the respective cutters 43. The latter ejectors I prefer to form of springs; but in each case the ejectors may be of any suitable material; and they are held by friction or otherwise in the various openings formed therefor in the plate, so that they are free to be moved transversely with reference to the plate 19. These ejectors are of various lengths, depending on the relative times when it is desired to have them effective in stripping the sheet material from the cutters, as hereinafter described.

As the operating wheels rotate clockwise, as indicated in Figure 5, and the die bed and die are drawn towards the platen 31, by the links 37, there is then no relative movement of the bed and die. The two are held in relative positions by the levers 27, each of which has one arm meshing with the gear rack 25 and the other arm carrying a roller or pin 55 which plays in a slot 56 in the lever 57. Each of these levers 57 has one end pivoted, at the point 58, to the frame, and the other end carries a pin or roller 60 which plays in a groove 36 in the corresponding wheel 35. The purpose of these levers 57 is to move the die and bed relatively by means of the groove 36; but as the left hand portion of the groove is circular, there is no movement of the lever as the wheel rotates during one half of a rotation, or until the position of Figure 7 is reached.

As the wheels rotate beyond the position of Figure 7 the links 37 are forced to the left by the wheels 35, and, at the same time, the cam portions 61 of the grooves 36 cause the levers 57 to lower. The movements of the links cause the bed to be forced to the left and the action of the levers causes the racks 25 and 26 to hold the die against the platen. This double action separates the bed and die and allows the sliding ejectors to project part way through the back of the die. Then as the wheels 35 rotate further the bed and die are gradually swung from the vertical to the horizontal position. Figures 9 and 10 illustrate this double movement, the bed moving away from the die and both moving away from the platen as the position of Figures 11 and 12 is approached.

At this time the ejector 47 forces the piece 63 of the sheet which is being operated on away from the cutter 41, as the ejector is fixed to the cutter plate 19. As a consequence, when in this position the waste piece 63 is stripped and stacked on the floor of the frame or elsewhere.

As the mechanism passes from the position of Figure 11 to that of Figure 13, the arrangement is such that the grooves 36 force the die towards the bed 17, and thus the ends of the slidable ejectors come successively against the bed 17 and are forced outwardly, forcing successively the various pieces of cut material from the cutters. As shown, the ejectors 53 first force the disks 65 from the cutters 43, stacking them by themselves on the floor or elsewhere. At the same time or sooner or later, as may be desired, the ejectors 51 force the disk 66 from the cutter 42, and these disks are thus stacked by themselves or with the disks 65. And finally the ejectors 48, 50 and 52 force the finished gasket 44 from the cutters, stacking them by themselves. This last operation occurs, preferably, as the mechanism approaches the initial position of Figure 5 so that the gaskets are dropped at this position.

It will be understood that the shape and positions of the slots 56 and 40, and the grooves 36, may be varied as desired to bring about various results; such as the positions of the mechanism when the stripping is to take place, or the number of strippings that are to be produced. Also various modifications may be made in the mechanism otherwise by those familiar with the art without departing from the spirit of my invention as disclosed herein and as covered by the claims hereof.

Figure 15 illustrates a modified cutting press by the use of which my method may be carried out. This press comprises a base 70 on which is fixed a frame 71 which supports the operating mechanism. The cutting die 72 and the die bed 73 are mounted for slidable movement relative to the frame and to each other. These members are supported by and are operated by the wheel 74 and its elements. Fixed to the shaft 75, which is rotatably mounted in the frame and which supports the wheel 74, is an arm 76 which is pivoted to one end of a link 77. The other end of the link is pivoted to a shaft 78, and this shaft supports and operates a bed 73 by means of plates 80 to which the bed is fixed, the bed also being guided in the frame by the plates. The die is supported and operated by the wheel 74 by means of a groove 83 formed in the wheel in which plays a roller 84. The roller is rotatably mounted in the end of the arm 85, and the other end of this arm is attached to the cutting die 72 by suitable means.

In this case the die and bed are moved relatively to each other and relatively to the platen without being rotated. As the wheel rotates clockwise as indicated by the arrow, from the position of Figure 15, the bed and die will be brought together, operating the ejectors, until the initial position is reached, when they are furthest removed from the platen, and they will then be forced towards the platen. After the cutting operation the curve of the groove is such that the die is operated relatively to the die bed about as set forth with reference to the other cutting press. Obviously the relative movements of the die and bed can be controlled by the shape of the groove 83, and the distance they are away from the platen can be controlled by the length of the arm 76.

It is to be noted that the arrangements of Figures 1 to 3 and 5 to 14, inclusive, and of Figure 15, both include the elements of a die bed and a cutting die, which are relatively movable with respect to each other, under control, and which are both movable with respect to the platen, also under control, together with suitable ejectors in conjunction with said die bed and cutting die, effectively to ensure ejection of die cut material at proper times, under control; and it is also to be noted that I contemplate such arrangements, either with movements of the die bed and cutting die directly towards and from the platen, as in Figure 15, or in some other manner, as in Figures 1 to 3, and 5 to 14, inclusive.

It is further noted that, generally speaking, the die bed and cutting die should occupy a position other than directly horizontal during the ejecting operations, so that the ejected material may be properly delivered away from the parts, and away from the strip of stock; as in both the arrangements herein illustrated: and also the cut out material is in any case carried away from the position of the platen to some other ejecting location, prior to operation of the ejectors, so that such cut out material may be delivered at some location away from the platen, as in both of the arrangements herein illustrated.

While I have herein shown and described only certain embodiments of the features of my present invention, still I do not intend to limit myself thereto, except as I may do so in the claims to follow.

This application is a substitution for my co-pending application for Letters Patent on improvements in Apparatus and method of cutting articles from sheets, Serial No. 247,173, filed on January 6, 1939, and allowed on August 15, 1939.

I claim:

1. In a cutting die; a body plate fitted with cutting rules; a plurality of compressible and expansible ejectors, of various lengths; said ejectors being slidably mounted transversely through the die plate, and adapted to project beyond either edge of the cutting rules.

2. In a machine for cutting articles from sheet material; a frame, a platen for backing the sheet to be cut fixed to the frame; a die bed movably mounted in the frame; a cutting die movably mounted in the frame between the bed and the platen; the said die comprising a body plate and cutters fixed to the plate and projecting therefrom and ejectors of various lengths slidably mounted transversely through the plate and adapted to project beyond either edge of the cutting rules; means for moving the bed and die relatively to each other, and means for moving the bed and die relatively to the platen.

3. In a machine as claimed in claim 2 including means for swinging the bed and die from a horizontal to a vertical position as they are moved towards the platen.

4. In a machine as claimed in claim 2, including means for rotating the bed and die from a vertical to a horizontal position as they are moved away from the platen.

5. A machine for cutting articles from sheet material comprising a frame; a platen fixed to the frame for backing the sheet to be cut, a cutting die and a die bed movably mounted in the frame; cutters fixed to the die and yielding ejectors of various lengths slidably mounted transversely in the die body and adapted to project beyond either edge of the cutting rules; and means for moving the die and bed relatively and relative to the platen and means for rotating the die and bed through substantially 90 degrees.

6. In a cutting die; a body plate fitted with cutting rules; a plurality of stripper plates attached to a plurality of compressible and expandible ejectors, or various lengths; said ejectors being slidably mounted transversely through the die plate, and adapted to project beyond the base edge of said cutting rules; and said stripper plates being adapted to project beyond the cutting edge of the cutting rules.

7. In a machine of the class described, the combination of a platen, a die bed and a cutting die, suitable cutting rules fixed to the die and adapted to co-operate with the platen for cutting purposes, ejectors movably mounted in the die and adapted for co-operation with the die bed, said ejectors being located in proximity to the cutting rules and adapted for ejecting co-operation with the die bed at various relative positions between said parts, together with suitable means effective to cause movement of the die bed and die conjointly into cutting relationship to the platen, during one operation, and effective to cause relative movements of the die bed and die with respect to each other harmoniously with withdrawal of said parts from the platen during another operation, substantially as described.

8. In a machine of the class described, the combination with a platen, of a die bed and a cutting die, suitable cutting rules in said cutting die and adapted to co-operate with the platen for cutting purposes, ejectors movably mounted in the cutting die in selected relationship with respect to the rules aforesaid, said ejectors and die bed being relatively engageable when the die bed and cutting die are moved into proper positions relative to each other effectively to cause ejection action of the ejectors on the material cut by said rules, together with means operative to move the die bed and cutting die harmoniously towards the platen, and to move said die bed and cutting die selectively away from the platen on another operation of said parts, substantially as described.

9. In a machine of the class described, the combination with a platen, of a die bed and a cutting die, all said parts being movable relatively with respect to each other, suitable cutting rules fixed to the cutting die, suitable ejectors movably mounted with respect to the cutting die, said ejectors and said die bed being engageable with each other to effect ejection operations, the ejectors being suitably positioned with respect to the cutting rules, together with means operative effectively to ensure movement of the die bed and cutting die, and the platen, towards each other during one operation for cutting purposes, and to ensure movement of the die bed and the cutting die, and the platen away from each other during another operation, said last named movement being variable between the die bed and the cutting die, whereby the engagement of the die bed with the ejectors during said movement is of variable nature, substantially as and for the purpose set forth.

10. In a machine of the class described, the combination with a platen, of a die bed and a cutting die, suitable cutting rules carried by the cutting die, suitable ejectors movably mounted in the cutting die in selected positions with respect to the rules, relatively engageable parts on the die bed and the ejectors effective to move the ejectors for ejecting purposes with respect to the cutting die, when the die bed and cutting die are moved into effective position with respect to each other, together with suitable means interconnecting the platen, die bed, and cutting die, and means to operate said interconnecting means effectively to move the die bed and cutting die, and the platen towards each other harmoniously, on one operation, and to move the die bed and cutting die, and the platen away from each other, on another operation, said last named movement being controlled to ensure variable movements of the die bed and cutting die with respect to each other during their conjoint movement away from the platen, substantially as and for the purpose set forth.

11. In a machine of the class described, the combination with a platen, of a cutting die, suitable cutting rules fixed to said cutting die, suitable ejectors movably carried by said cutting die and in suitable positions with respect to the cutting rules aforesaid, together with means interconnecting the platen and the cutting die, and means to operate said interconnecting means effectively to move the cutting die and said rules and ejectors, and the platen towards each other on one operation, and effectively to move the cutting die and the rules away from the platen during another operation, and to ensure movements of the ejectors relatively with respect to the cutting rules during said last named operation, substantially as and for the purpose set forth.

12. In the art of die cutting blanks from a sheet of stock material which die cutting operation includes the distinct cutting and withdrawing operations, and which blanks are of contour including a plurality of distinct die cut perimeters, that improvement which consists in first performing the cutting of all of said perimeters at a single cutting operation, and thereafter performing the withdrawing and ejecting operations for the several perimeters progressively, whereby the material ejected from the several perimeters is delivered therefrom at distinct operations and in predetermined timing.

13. In the art of die cutting blanks from a sheet of stock material which die cutting operation includes the distinct cutting and withdrawing operations, and which blanks include a plurality of distinct die cut perimeters, that improvement which consists in first performing the cutting of all of said perimeters at a single cutting operation, and thereafter performing the withdrawing and ejecting operations for the several perimeters selectively and non-simultaneously, whereby said withdrawing and ejecting operations for selected ejectors are delayed and accelerated with respect to each other, for the purposes set forth.

14. In the art of die cutting blanks from a sheet of stock material which die cutting operation includes the distinct cutting and releasing operations, that improvement which consists in first effecting the cutting operation for all portions of die cut perimeter simultaneously and with sticking engagement of substantially all portions of die cut perimeter with the cutting die edges, and thereafter effecting successive predetermined disengagement of selected perimeter portions from the cutting die edges, for the purposes set forth.

15. In the art of die cutting blanks from a sheet of stock material which die cutting operation includes the distinct cutting and releasing operations, that improvement which consists in first effecting the cutting operation for all portions of die cut perimeter simultaneously and with the sheet of stock material in a substantially vertical position and with sticking engagement of substantially all portions of die cut perimeter with the cutting die edges, and thereafter effecting successive predetermined downward disengagement of selected perimeter portions from the cutting die edges and with the die cut portions lying in substantially horizontal position, for the purposes set forth.

16. A plurality of ejectors slidably mounted in a die, said ejectors permitting sticking engagement of all or part of the cut material with the cutting edges of said die, together with ejecting means operative to eject said cut material from the die with a delayed movement immediately after the moment of cutting, and with an accelerated movement of said cut material from the die at a selected time thereafter.

17. A method of cutting and stripping sheet material, said method comprising supporting a sheet of material to be cut in contact with a stationary backing; then subjecting said sheet of material to the action of a set of cutting rules and a plurality of compressible and expansible ejectors of various predetermined lengths slidably mounted parallel to the cutting rules, to compress said ejectors against the material of the sheet during cutting of said sheet by said rules.

18. A method of die cutting objects from a sheet of stock, consisting of first subjecting said sheet to action of a series of cutting rules and compressible ejectors under compression between said rules, then releasing the compression of the ejectors and leaving the die cut objects in sticking engagement with the rules, then selectively and progressively moving the ejectors in the discharging direction to selectively and progressively disengage the objects from the rules.

19. A method of die cutting objects from a sheet of stock, consisting of first subjecting said sheet to action of a series of cutting rules and compressible ejectors under compression between said rules, then releasing the compression of the ejectors and leaving the die cut objects in sticking engagement with the rules, then selectively moving the ejectors in the discharging direction to selectively disengage the objects from the rules.

EMIL MATHA.